UNITED STATES PATENT OFFICE 2,647,914

MANUFACTURE OF AN ALKYL NITRATE

William G. Allan, Ardrossan, and Thomas J. Tobin, Saltcoats, Scotland, assignors to Imperial Chemical Industries Limited, a corporation of Great Britain No Drawing. Application June 12, 1951, Serial No. 231,272. In Great Britain July 24, 1950

10 Claims. (Cl. 260—467)

The present invention relates to an improvement in the manufacture of isopropyl nitrate.

It has hitherto been the practice to prepare isopropyl nitrate by means of the chemical interaction between an isopropyl halide and a metallic nitrate, since hitherto all attempts made to manufacture the compound by direct nitration of isopropyl alcohol have proved impracticable owing to the excessive tendency for a violent decomposition of the reaction mixture to take place which results in the destruction of the isopropyl nitrate.

In the manufacture of the lower aliphatic esters of nitric acid from the corresponding alcohols it is known to carry out the reaction continuously by running a stream of nitric acid of approximately 70% concentration by weight and a stream of the corresponding alcohol into heated aqueous nitric acid to which a quantity of urea has been previously added, and continuously distilling off the nitric ester and other easily volatile products, the volume of the reaction mixture being kept constant by continuously running away a portion thereof to waste, and a small concentration of urea being maintained in the reaction mixture by including urea in solution in the stream of the alcohol introduced, with the object of preventing the fuming off of the reaction mixture by minimising the concentration of nitrous acid therein. Hitherto, however, this method had not given successful results when applied to the continuous manufacture of isopropyl nitrate from isopropyl alcohol since the reaction mixture tends to decompose violently.

According to the present invention the process for the continuous production of isopropyl nitrate by the continuous distillation of a mixture of easily volatile products from a boiling reaction mixture formed from nitric acid and isopropyl alcohol and into which separate streams of nitric acid and isopropyl alcohol are introduced and in which a urea concentration effective to destroy nitrous acid is maintained is characterised in that there is passed through said boiling reaction mixture undergoing continuous distillation a stream of a gas chemically indifferent to it.

In practice it is usual for a portion of the reaction mixture to be run to waste. Preferably the mixture of easily volatile products is such as to boil at a vapour temperature up to and including 98° C.

The indifferent gas may be for instance air, nitrogen, carbon dioxide or steam.

After condensing the vapors of said mixture of volatile materials the ester rich layer of the condensate is separated from the water rich layer and washed with an aqueous medium.

The urea concentration in the reaction mixture should preferably be maintained from start to finish at not less than 3% by weight, and the nitric acid concentration of the reaction mixture, including the nitric acid combined with the urea, is preferably from 35–45%. Under these conditions the water rich layer of the condensate floats on top of the ester rich layer at 15° C.

In accordance with a preferred form of the invention not less than 20 parts of water are introduced in admixture with 120 parts of the combined aqueous streams of nitric acid and isopropyl alcohol and in accordance with a further preferred form of the invention the water content of the nitric acid stream is 30% and the water content of the isopropyl alcohol stream is 25%.

Preferably the isopropyl alcohol is introduced into the reaction mixture as aqueous isopropyl alcohol containing urea in solution. This facilitates the maintenance of the required concentration of urea in the reaction mixture as the solubility of urea in a 75% solution of isopropyl alcohol in water at room temperature is substantially higher than that in dry isopropyl alcohol. Moreover, the introduction of water into the reaction mixture in amounts exceeding that corresponding to the employment of streams of 70% nitric acid and of 100% isopropyl alcohol permits unstable byproducts to be removed with the refuse acid at an increased rate.

If desired the nitric acid stream may also include urea in solution.

It is believed that the passage of the stream of the indifferent gas through the reaction mixture shortens the duration of the contact between any volatile unstable compounds and the hot reaction mixture.

The relative amounts of aqueous nitric acid and preferably aqueous isopropyl alcohol constituting the incoming streams are such as to maintain in the reaction mixture the predetermined nitric acid concentration, which as hereinbefore indicated is preferably between 35 and 45%.

The invention is illustrated by the following example, in which the percentages are by weight except where otherwise indicated.

Example

A stainless steel reaction vessel connected to a still-head and condenser and having a steam heating coil, a constant level overflow, an inlet for a gas stream leading near the bottom and inlets for the liquid streams terminating above the constant level, is filled to the overflow with 50 kg. of 40% strength aqueous nitric acid in which is dissolved 5 kg. of urea. The contents are heated by means of low pressure steam coils to a temperature of 102° C. Into this acid two continuous simultaneous streams of liquid are added, the first liquid being aqueous nitric acid of 70% strength at a rate of 16 litres per hour; and the second being a solution prepared by dissolving 4.27 kg. of urea in a mixture of 32 kg. isopropyl alcohol and 10.7 kg. water, this solution being added at a rate of 19 litres per hour. A continuous stream of air is passed through the reaction mixture during the entire process. The reaction temperature is maintained at 102° C., and the still-head temperature is 95° C. The rate of distillation of crude ester is 15-16 litres per hour and the volume ratio of the upper water-rich layer to the lower ester-rich layer in the condensate, which is at approximately 25° C., is 0.67:1. The refuse acid which overflows from the reaction vessel approaches a steady concentration of 42% nitric acid, with a urea concentration of 9%. The crude isopropyl nitrate is continuously separated from the aqueous distillate and washed successively with water and weak sodium carbonate solution.

No difficulty is experienced in keeping the process running for several days without discarding the contents of the reaction vessel at the end of a day's working.

The yield of washed and filtered isopropyl nitrate is 68% of the theoretical, based on isopropyl alcohol. If desired isopropyl alcohol may be recovered from the aqueous layer of the condensate by fractional distillation after neutralising the nitric acid contained in this layer. The amount so recovered amounts to about 15% of the isopropyl alcohol introduced.

What we claim is:

1. A process for the continuous production of isopropyl nitrate by the continuous distillation of a mixture of easily volatile products from a boiling reaction mixture formed from nitric acid and isopropyl alcohol and into which separate streams of nitric acid and isopropyl alcohol are introduced and in which a urea concentration effective to destroy nitrous acid is maintained characterised in that there is passed through said boiling reaction mixture undergoing continuous distillation a stream of a gas chemically indifferent to it.

2. A process as claimed in claim 1 wherein a portion of the reaction mixture is run to waste.

3. A process as claimed in claim 1 wherein the mixture of easily volatile products is such as to boil at a vapour temperature up to and including 98° C.

4. A process as claimed in claim 1 wherein the stream of the gas chemically indifferent to the boiling reaction mixture is at least one member from the group consisting of air, nitrogen, carbon dioxide, and steam.

5. A process as claimed in claim 1 wherein the urea concentration in the reaction mixture is maintained from start to finish at not less than 3% by weight.

6. A process as claimed in claim 1 wherein the nitric acid concentration of the reaction mixture, including the nitric acid combined with the urea, is from 35 to 45%.

7. A process as claimed in claim 1 wherein not less than 20 parts of water are introduced in admixture with 120 parts of the combined aqueous streams of nitric acid and isopropyl alcohol.

8. A process as claimed in claim 7 wherein the water content of the nitric acid stream is 30% and the water content of the isopropyl alcohol stream is 25%.

9. A process as claimed in claim 1 wherein the isopropyl alcohol is introduced into the reaction mixture as aqueous isopropyl alcohol containing urea in solution.

10. A process as claimed in claim 1 wherein the nitric acid stream includes urea in solution.

WILLIAM G. ALLAN.
THOMAS J. TOBIN.

References Cited in the file of this patent

UNITED STATES PATENTS

| Number | Name | Date |
| --- | --- | --- |
| 1,967,551 | Crawford | July 24, 1934 |
| 2,243,471 | Olin | May 27, 1941 |
| 2,254,352 | Cloud | Sept. 2, 1941 |
| 2,294,849 | Olin et al. | Sept. 1, 1942 |
| 2,453,942 | Smith et al. | Nov. 16, 1948 |